(12) United States Patent
O'Neill et al.

(10) Patent No.: US 9,429,434 B2
(45) Date of Patent: *Aug. 30, 2016

(54) SYSTEM AND METHOD FOR MAPPING AN INDOOR ENVIRONMENT

(71) Applicant: Google Inc., Mountain View, CA (US)

(72) Inventors: Thomas Germano O'Neill, Mountain View, CA (US); Carl Ferman Smith, Mountain View, CA (US); Alena Fong, Fremont, CA (US); Mohammed Waleed Kadous, Santa Clara, CA (US); Russell Heywood, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/855,516

(22) Filed: Sep. 16, 2015

(65) Prior Publication Data

US 2016/0003626 A1   Jan. 7, 2016

Related U.S. Application Data

(63) Continuation of application No. 13/404,292, filed on Feb. 24, 2012, now Pat. No. 9,170,113.

(51) Int. Cl.
 *G01C 21/20* (2006.01)
 *H04W 4/02* (2009.01)
 *H04W 4/04* (2009.01)

(52) U.S. Cl.
 CPC ............ *G01C 21/206* (2013.01); *H04W 4/028* (2013.01); *H04W 4/043* (2013.01)

(58) Field of Classification Search
 CPC ... G01C 21/206; H04W 4/043; H04W 4/028
 See application file for complete search history.

(56) References Cited

U.S. PATENT DOCUMENTS

| | | | |
|---|---|---|---|
| 5,398,276 A | * | 3/1995 | Lemke .................. H04W 24/00 356/4.01 |
| 7,155,336 B2 | | 12/2006 | Dorfman et al. |

(Continued)

FOREIGN PATENT DOCUMENTS

| | | |
|---|---|---|
| EP | 2147392 | 11/2008 |
| EP | 2185894 | 2/2009 |

(Continued)

OTHER PUBLICATIONS

Michael Harville, Ramin Samadani, Dan Tretter, Debargha Mukherjee, Ullas Gargi, Nelson Chang, Mediabeads: An Architecture for Path-Enhanced Media Applications, Jun. 27-30, 2004, 4 pages.

(Continued)

*Primary Examiner* — Yuen Wong
(74) *Attorney, Agent, or Firm* — Lerner, David, Littenberg, Krumholz & Mentlik, LLP

(57) ABSTRACT

A system and method for mapping an indoor environment. A client device may receive an indication of a starting point on a floor plan. The client device may prompt the user to travel in a particular direction and indicate when the user can no longer travel in that direction. As the user travels from the starting point in the designated direction, the client device may gather information about the indoor environment. For example, the client device may gather wireless signal strength data, cellular tower strength data, or video image data while the user travels in the designated direction. The client device may associate the gathered information with the path the user traveled from the starting point to the ending point. The client device may indicate the area for which valid location information is available based on the path the user traveled and the information the user collected.

20 Claims, 9 Drawing Sheets

(56) References Cited

U.S. PATENT DOCUMENTS

| | | |
|---|---|---|
| 7,359,797 B2 | 4/2008 | Dorfman et al. |
| 7,450,003 B2 | 11/2008 | Weber et al. |
| 7,457,262 B1* | 11/2008 | Doshi .................. H04W 24/04 370/328 |
| 7,557,736 B1 | 7/2009 | Daily et al. |
| 7,587,276 B2 | 9/2009 | Gold et al. |
| 7,634,358 B2 | 12/2009 | Jendbro |
| 7,756,630 B2 | 7/2010 | Dorfman et al. |
| 7,920,072 B2 | 4/2011 | Smith et al. |
| 2003/0176986 A1 | 9/2003 | Dietsch et al. |
| 2006/0026170 A1 | 2/2006 | Kreitler et al. |
| 2006/0241860 A1 | 10/2006 | Kimchi et al. |
| 2007/0014488 A1 | 1/2007 | Chen et al. |
| 2007/0027887 A1 | 2/2007 | Baldwin |
| 2007/0200713 A1 | 8/2007 | Weber et al. |
| 2007/0204218 A1 | 8/2007 | Weber et al. |
| 2008/0028341 A1 | 1/2008 | Szeliski et al. |
| 2008/0043020 A1 | 2/2008 | Snow et al. |
| 2008/0147730 A1 | 6/2008 | Lee et al. |
| 2008/0183597 A1 | 7/2008 | Veerappan et al. |
| 2008/0238941 A1 | 10/2008 | Kinnan et al. |
| 2008/0240616 A1 | 10/2008 | Haering et al. |
| 2009/0040370 A1 | 2/2009 | Varanasi |
| 2009/0043504 A1 | 2/2009 | Bandyopadhyay et al. |
| 2009/0063034 A1 | 3/2009 | Han |
| 2009/0153492 A1 | 6/2009 | Popp |
| 2009/0177437 A1 | 7/2009 | Roumeliotis |
| 2009/0210388 A1 | 8/2009 | Elson et al. |
| 2009/0303036 A1 | 12/2009 | Sahuguet |
| 2009/0325607 A1 | 12/2009 | Conway et al. |
| 2010/0008337 A1 | 1/2010 | Bajko |
| 2010/0035637 A1 | 2/2010 | Varanasi et al. |
| 2010/0063997 A1 | 3/2010 | Sako et al. |
| 2010/0106408 A1 | 4/2010 | Kindberg |
| 2010/0107116 A1 | 4/2010 | Rieman et al. |
| 2010/0121567 A1 | 5/2010 | Mendelson |
| 2010/0123737 A1 | 5/2010 | Williamson et al. |
| 2010/0171757 A1 | 7/2010 | Melamed |
| 2010/0188088 A1 | 7/2010 | Nielsen et al. |
| 2010/0189312 A1 | 7/2010 | Nielsen et al. |
| 2010/0215250 A1 | 8/2010 | Zhu |
| 2010/0222999 A1 | 9/2010 | DeVries et al. |
| 2010/0293173 A1 | 11/2010 | Chapin et al. |
| 2010/0295971 A1 | 11/2010 | Zhu |
| 2010/0309226 A1 | 12/2010 | Quack et al. |
| 2010/0328344 A1 | 12/2010 | Mattila et al. |
| 2011/0007962 A1 | 1/2011 | Johnson et al. |
| 2011/0013014 A1 | 1/2011 | Wassingsbo |
| 2011/0064312 A1 | 3/2011 | Janky et al. |
| 2011/0084893 A1 | 4/2011 | Lee et al. |
| 2011/0137549 A1* | 6/2011 | Gupta .................. G01C 21/20 701/533 |
| 2011/0161855 A1 | 6/2011 | Prehofer |
| 2011/0177832 A1* | 7/2011 | Huang .................. G01S 5/02 455/457 |
| 2012/0072106 A1 | 3/2012 | Han et al. |

FOREIGN PATENT DOCUMENTS

| | | |
|---|---|---|
| EP | 1987683 | 1/2010 |
| EP | 2194508 | 6/2010 |
| KR | 20120010113 A | 2/2012 |
| WO | 2006127388 | 11/2006 |
| WO | 2007001314 | 1/2007 |
| WO | 2007100632 | 9/2007 |
| WO | 2007100740 A2 | 9/2007 |
| WO | 2008134901 | 11/2008 |
| WO | 2009020785 | 2/2009 |
| WO | 2010046123 | 4/2010 |
| WO | 2010059426 | 5/2010 |
| WO | 2010149843 | 12/2010 |
| WO | 2011016995 | 2/2011 |
| WO | 2012011690 A2 | 1/2012 |

OTHER PUBLICATIONS

International Search Report and Written Opinion for Application No. PCT/US2013/027303 dated Jun. 26, 2013.

Supplementary European Search Report for Application No. 13752504.4 dated Apr. 2, 2015.

Bradley Paul Van Tonder, Adaptive User Interfaces for Mobile Map-Based Visualisation, Dec. 2008, 226 pages.

Johannes Schoning, Keith Cheverst, Markus Lochtefeld, Antonio Kruger, Michael Rohs, Faisal Taher, Photomap: Using Spontaneously Taken Images of Public Maps for Pedestrian Navigation Tasks on Mobile Devices, ACM's MobileHCI09, Sep. 15-19, 2009, 10 pages.

Partial European Search Report for European Patent Application No. 16167000.5 dated Jun. 15, 2016.

Anonymous: "Wi-Fi Mapping Using GPS—TamoGraph." Dec. 29, 2011. XP055286936. Retrieved from the Internet: <https://web.archive.org/web/20111229071911/http://www.tamos.com/products/witi-site-survey/gps-mapping.php>.

Tim L. Webster et al: "Using topographic lidar to map flood risk from storm-surge events for Charlottetown, Prince Edward Island, Canada." Canadian Journal of Remote Sensing. vol. 30, No. 1. Jan. 1, 2004, pp. 64-76. XP055286939. ISSN: 0703-8992. DOI: 10.5589/m03-053.

Extended European Search Report dated Jul. 22, 2016, for European Patent Application No. 16167000.5.

\* cited by examiner

200

600

800

SYSTEM AND METHOD FOR MAPPING AN INDOOR ENVIRONMENT

CROSS-REFERENCE TO RELATED APPLICATIONS

The present application is a continuation of U.S. patent application Ser. No. 13/404,292, filed Feb. 24, 2012, the disclosure of which is incorporated herein by reference.

BACKGROUND

Portable electronic devices, such as smartphones, personal digital assistants (PDAs) and handheld location services devices are capable of performing a variety of functions, including location reporting, mapping, and route-finding operations. These portable electronic devices often include an interface for receiving location information from global navigation satellite system (GNSS) satellites. These GNSS systems are capable of providing location information with a high degree of accuracy, such as within a few yards of resolution. However, these satellites require a direct line-of-sight to multiple satellites to achieve an accurate position fix. As such, these systems such as GPS are generally unsuitable for use in indoor navigation where such a line-of-sight is unavailable. Methods have been developed for identifying a location based on other factors, but many of these factors lack the global accessibility provided by a satellite network.

BRIEF SUMMARY

A system and method for mapping an indoor environment is provided. A client device may receive an indication of a starting point on a floor plan. The client device may prompt the user to travel in a particular direction and indicate when the user can no longer travel in that direction, or the direction of travel may be determined by the client device in response to the user indicating a second location after the user has traveled to the second location. As the user travels from the starting point in the designated direction, the client device may gather information about the indoor environment. For example, the client device may gather wireless signal strength data, cellular tower strength data, or video image data while the user travels in the designated direction. The client device may associate the gathered information with the path the user traveled from the starting point to the ending point. Although the client device is described as performing the association operation, the association may also be performed by a remote server using data provided by the client device. As the user travels from point to point, the client device may indicate the area for which valid location will be available once the mapping operation is complete. The client device may indicate the area for which valid location information is available based on the path the user traveled and the information the user collected.

Aspects of the disclosure may provide a computer-implemented method for mapping of an indoor location. The method may include displaying a floor plan image corresponding to an indoor location, receiving a first input to indicate a first location on the floor plan image, gathering initial location information at the first location, and generating an indoor map, using a processor, using the initial location information wherein the indoor map includes an association of the initial location information with the first location. The method may further include repeating the location information gathering process at a new location to associate new location information with the new location in the indoor map. The method may include gathering additional location information as the user travels from the first location to a second location, receiving a second input to indicate the second location on the floor plan image, determining a path from the first location to the second location, and associating the additional location information with at least one location within the map corresponding to the path. The method may include prompting the user to walk in a straight line when traveling from the first location to the second location. The method may include providing instructions to a user to travel in a particular direction. The location information may be wireless signal data associated with one or more wireless nodes. The first input may include performing a selection operation with an indicator placed on the floor plan image. The method may also include providing a visual indication on the floor plan image of the path. The visual indication may indicate an area of the indoor map where the location information identifies a particular location. The building floor plan may be received from a remote server. The method may also include determining an approximate location, providing the approximate location to the remote server, receiving a list of floor plans associated with indoor environments proximate to the approximate location, and selecting the building floor plan from the list. The method may include inducing a user to walk at a constant speed by at least one of vibration or playing an audio tone. The method may include identifying the user's direction of travel by at least one of determining a relative orientation using the first location and the second location, or using at least one of an accelerometer, a gyroscope, or a compass. The method may include determining a location precision for the data gathering operation, and using the location precision to determine a location resolution for the indoor map. The location precision may be determined using a number of available wireless access points for which signal strength data is available. The location precision may determine at least one of the size of an indicator for indicating the current location, or the width of a stripe for indicating an area of the indoor map for which the location information has been gathered. The method may include determining a coverage level of the indoor map compared to the floor plan image, and identifying the indoor map as complete when the coverage level is greater than a predetermined threshold. The method may include verifying the indoor map by gathering data when traveling in one or more paths perpendicular to at least one path used to generate the indoor map.

Aspects of the disclosure may also provide a non-transitory computer readable storage medium containing instructions, that, when executed by a processor, cause the processor to perform a method. The method may include displaying a floor plan image corresponding to an indoor location, receiving a first input to indicate a first location on the floor plan image, gathering initial location information at the first location, and generating an indoor map, using a processor, using the initial location information wherein the indoor map includes an association of the initial location information with the first location. The instructions may further include repeating the location information gathering process at a new location to associate new location information with the new location in the indoor map. The instructions may further include gathering additional location information as the user travels from the first location to a second location, receiving a second input to indicate the second location on the floor plan image, determining a path from the first location to the second location, and associating the additional location information with at least one location within the map corresponding to the path. The location information may be wireless signal data associated with one or more wireless nodes. The first input may include performing a selection operation with an indicator placed on the floor plan image. The instructions may further include providing a visual indication on the floor plan image of the path, wherein the visual indication indicates an area of the indoor map where the location information identifies a particular location.

Aspects of the disclosure may provide a processing system for mapping an indoor environment. The processing system may include a memory, coupled to at least one processor, for storing location information and a map of an indoor environment, wherein the map comprises an association of the location information with at least location within the map, and the at least one processor. The at least one processor may be configured to provide a floor plan image corresponding to the indoor environment, receive a first input to indicate a first location on the floor plan image, gather the location information at the first location, and generate the map by associating the location information with the first location in the map. The processor may be further configured to repeat the location information gathering process at a new location to associate new location information with the new location in the indoor map. The processor may be further configured to gather additional location information as the user travels from the first location to a second location, receive a second input to indicate the second location on the floor plan image, determine a path from the first location to the second location, and associate the additional location information with at least one location within the indoor map corresponding to the path. The processing system may further include a wireless receiver, and the location information may include wireless signal strength data. The processor may be further configured to gather the wireless signal strength data using the receiver. The processing system may further include at least one of an accelerometer, a compass, or a gyroscope to identify at least one of a direction or speed of travel. The processing system may further include a display for displaying the floor plan image, and the processor may be further configured to display an indicator on the floor plan image to indicate at least one of the first location or the second location. The processor may be further configured to determine a location precision for the location information, and use the location precision to determine a location resolution for the indoor map. The location precision may be determined using a number of available wireless access points for which signal strength data is available. The location precision may determine at least one of the size of an indicator for indicating the current location, or the width of a stripe for indicating an area of the indoor map for which the location information has been gathered.

DETAILED DESCRIPTION

Figure 1:
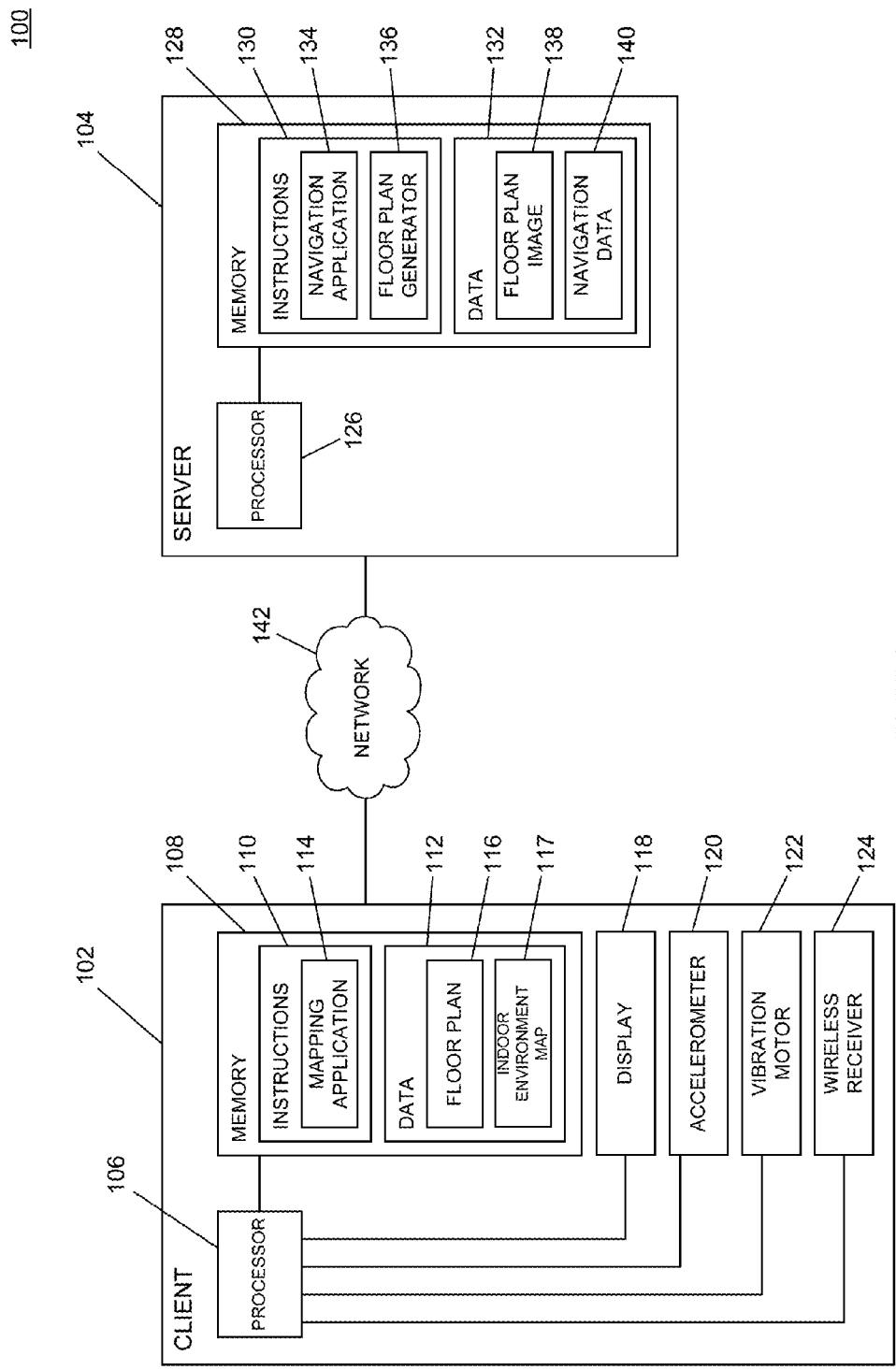
FIG. 1 is a system diagram depicting an example of a system for mapping an indoor environment in accordance with aspects of the disclosure.

The aspects, features and advantages of the present disclosure will be appreciated when considered with reference to the following description of preferred embodiments and accompanying figures. The following description does not limit the disclosure; rather, the scope is defined by the appended claims and equivalents. While certain processes in accordance with example embodiments are shown in the figures as occurring in a linear fashion, this is not a requirement unless expressly stated herein. Different processes may be performed in a different order or concurrently.

The disclosure describes systems and methods for mapping an indoor environment. Aspects of the disclosure provide a flexible, portable, user-friendly system for gathering location data in indoor environments such that the location data may be used to enable indoor navigation operations. Elements of the system relate to gathering location information and associating the gathered location information with particular points in the indoor environment.

A client device may receive a floor plan from a remote server, and a user may provide an indication of a starting point (e.g., the current location of the user) on the floor plan. The client device may prompt the user to travel in a particular direction and indicate when the user can no longer travel in that direction. As the user travels from the starting point in the designated direction, the client device may gather information about the indoor environment. For example, the client device may gather wireless signal strength data, cellular tower strength data, or video image data while the user travels in the designated direction. When the user cannot travel in the designated direction any further, they may indicate as such to the client device to establish an ending point. The client device may then associate the gathered information with the path the user traveled from the starting point to the ending point. The client device may also transmit gathered information and a location to a remote server for association and generation of an indoor map. The client device may indicate the area for which valid location information is available based on the path the user traveled and the information the user collected, or the remote server may provide information to the client device indicating an area for which valid location information is available. The client device may continue to prompt the user to walk in a particular direction until enough information has been gathered about the indoor environment to provide navigation services for the indoor environment.

The client device and remote server may provide various features to assist in the gathering of location information. For example, the client device may depict a visual representation of the floor plan to be mapped, with areas for which the user has successfully mapped shaded in a particular color. The client device may provide guidance to assist the user with traveling at a constant speed during a mapping operation, such as playing a particular song or beat, or vibrating a particular tempo or frequency. The client device may also determine an average speed during the data gathering process and/or use step detection to detect deviations from steady speeds (e.g., stopping), at which point the client device may prompt the user to walk at a steady speed.

The client device may gather information more than once to verify that the gathered information is accurate. The client device may compare a first set of gathered data to a second set of gathered data to ensure consistency, and prompt the user to gather information again if the data is inconsistent. The client device may make use of a touch screen interface, where the user may position an indicator, such as a crosshair, to indicate their current location on an image of the floor plan. The interface may allow for zooming and scrolling operations to assist the user with indicating their current location.

For situations in which the systems and methods described herein collect information about users, the users may be provided with an opportunity to opt in/out of programs or features that may collect personal information (e.g., information about a user's location, a user's preferences, or a user's location history). In addition, certain data may be anonymized and/or encrypted in one or more ways before it is stored or used, so that personally identifiable information is removed. For example, a user's identity and location may be anonymized and encrypted so that the personally identifiable information cannot be determined or associated for the user and so that identified user preferences or user interactions are generalized (for example, generalized based on user demographics) rather than associated with a particular user.

FIG. 1 is a system diagram depicting an example of a system 100 for mapping an indoor environment in accordance with aspects of the disclosure. As shown in FIG. 1, an example of an indoor environment mapping system 100 includes a client 102 coupled to a remote server 104 via a network 142. The client device 102 may be operable to gather information about an indoor environment, and associate the information with a floor plan to generate a map of the indoor environment. The client device 102 may be computing device as known in the art. For example, the client device 102 may be laptop computer, a desktop computer, a netbook, a rack-mounted server, a smartphone, a cellular phone, a tablet computer, or any other device containing programmable hardware or software for executing instructions. Although aspects of the disclosure generally relate to a portable device, the client device 102 may be implemented as multiple devices with both portable and non-portable components (e.g., software executing on a rack-mounted server with a mobile interface for gathering location information). The computing device 102 may include a processor 106, a memory 108 and other components typically present in general purpose computers. The processor 106 may be any processor capable of execution of computer code. Alternatively, the processor may be a dedicated controller such as an application-specific integrated circuit ("ASIC") or other processing device.

The client device 102 may have all of the components normally used in connection with a wireless mobile device such as a central processing unit (CPU), memory (e.g., RAM and ROM) storing data and instructions, an electronic display (e.g., a liquid crystal display ("LCD") screen or touchscreen), user input (e.g., a keyboard, touch-screen or microphone), camera, a speaker, a network interface component, and all of the components used for connecting these elements to one another. Some or all of these components may all be internally stored within the same housing, e.g. a housing defined by a plastic shell and LCD screen.

The memory 108 may store information that is accessible by the processor 106, including instructions 110 that may be executed by the processor 106, and data 112. The memory 108 may be of any type of memory operative to store information accessible by the processor 106, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

The instructions 110 may be any set of instructions to be executed directly (such as machine code) or indirectly (such as scripts) by the processor 106. For example, the instructions 110 may be stored as computer code on the computer-readable medium. In that regard, the terms "instructions" and "programs" may be used interchangeably herein. The instructions 110 may be stored in object code format for direct processing by the processor 106, or in any other computer language including scripts or collections of independent source code modules that are interpreted on demand or compiled in advance.

The instructions 110 may comprise a mapping application 114 for generating an indoor environment map 117 using a floor plan 116 and information gathered about the indoor environment. The mapping application 114 may interface with the server 104 to receive the floor plan 116 of the indoor environment. For example, the mapping application 114 may display a series of potential floor plans to a user of the client device 102, and allow the user to select a floor plan corresponding to the indoor environment the user wishes to map (see FIG. 2). The mapping application 114 may also operate to instruct the user to walk through the indoor environment that is to be mapped while the mapping application gathers information about the indoor environment. The mapping application 114 may apply the gathered information to the floor plan 116 to generate an indoor environment map 117. In some aspects, the mapping application 114 may gather the information and transmit the information to the server 104, and the server 104 may generate the indoor environment map 117. The mapping application 114 may be an "app" executing on a mobile device, such as a smart phone. For example, a user may download the mapping application 114 from an application marketplace such as the ANDROID MARKETPLACE.

While the mapping application 114 may be implemented as a distinct application, it may also be integrated with other programs or elements of the client device 102 to provide similar functionality and other functionalities. The instructions 110 may be implemented as software executed on the processor 106 or by other processing devices, such as ASICs, field-programmable gate arrays ("FPGAs").

The data 112 may be retrieved, stored or modified by the processor 106 in accordance with the instructions 110. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

Portions of the data 112 may comprise the floor plan 116 and the indoor environment map 117. The floor plan 116 may be received from the server 104 and function as a template to be populated with information gathered by the client device 102. The floor plan 116 may be stored as an image, a series of coordinates, a series of vectors, or any other suitable format. The indoor environment map 117 may be generated from the floor plan 116 in combination with data gathered by the client device 102 during the mapping operation. For example, locations within the floor plan may be associated with particular wireless signal strengths to enable a navigation application to identify a location on the floor plan by measuring local wireless signal strengths.

The client device 102 may further comprise a display 118. The display 118 may function to provide an interface for the user. The display 118 may be implemented as any display device, such as a liquid crystal display ("LCD"), cathode-ray tube ("CRT"), or light-emitting diode ("LED") display device. The display 118 may further allow the user to input data or commands, such as by including touch-screen technology. The display 118 may include a monitor having a screen, a projector, a television, a computer printer or any other device that is operable to display information. The client device 102 may accept user input via other components such as a mouse (not pictured). Indeed, devices in accordance with the systems and methods described herein may comprise any device operative to process instructions and transmit data to and from humans and other computers including general purpose computers, network computers lacking local storage capability, etc.

The client device 102 may also include one or more accelerometers 120. The accelerometer 120 may function to track movement of the client device 102, such as by determining a direction of acceleration or measuring force acting on the client device 102. For example, the accelerometer 120 may identify when the user takes a step by measuring the impact of the user's footfall on the client device 102. The client device 102 may include multiple accelerometers 120 for measuring acceleration along different axes. The accelerometer 120 may further include one or more gyroscopes or a compass for determining an orientation of the client device 102.

The client device 102 may also include a vibration motor 122. The vibration motor 122 may receive commands from the processor 106 to move a weight within the device. As the weight moves, the force generated by the movement may cause the client device 102 to vibrate. This vibration may be used to communicate with the user. For example, the vibration motor 122 may cause the client device 102 to vibrate for a particular amount of time at a regular interval to assist the user with maintaining a consistent pace during a mapping operation.

The client device 102 may further include a wireless receiver 124. The wireless receiver 124 may function to enable the client device 102 to communicate via a wireless protocol, such as cellular voice communications or with an 802.11 protocol network. Data for these wireless signals may be used in generation of the indoor environment map 117. For example, the client device 102 may capture wireless access point signal strengths at different locations within the indoor environment. The wireless receiver 124 may include an antenna for receiving a wireless signal. During a navigation operation, the client device 102 may identify a current signal strength and identify a location on the indoor environment map with the same or similar signal strengths to determine the location of the client device 102.

Although FIG. 1 functionally illustrates the processor 106 and memory 108 as being within the same block, the processor 108 and memory 110 may actually comprise multiple processors and memories that may or may not be stored within the same physical housing. Accordingly, references to a processor, computer or memory will be understood to include references to a collection of processors, computers or memories that may or may not operate in parallel.

The server 104 may be operable to send the floor plan 116 to the client device 102 and receive the indoor environment map 117 or information associated with the indoor environment from the client device 102. The server 104 may also generate the floor plan 116 using a floor plan image 138. The indoor environment map 117 may be stored on the server 104 as navigation data 140 for use in navigation operations conducted in the indoor environment associated with the indoor environment map.

The server 104 may be configured similarly to the client device 102, with a processor 126 and memory 128. As described with respect to the client device 102, the memory 128 may comprise a set of instructions 130 and a set of data 132. The processor 126 executes the instructions 130 to control operation of the server 104. The instructions 130 may include a navigation application 134 and a floor plan generator 136.

The navigation application 134 may function to provide navigation services. For example, the navigation application 134 may provide an indoor map to a client (such as the client device 102) as navigation data 140 to assist in location determination and route-finding operations performed by the client. The navigation data 140 may take the form of floor plan data populated with location information for indoor navigation provided to the client device 102 for display to the user and use in indoor navigation operations.

The floor plan generator 136 may use a floor plan image 138 to create a floor plan, such as the floor plan 116 used by the client device 102. The floor plan image 138 may be an image, such as a JPEG, BMP, GIF, or other image format that depicts the interior of a building or indoor environment. For example, the floor plan image 138 may depict a blueprint. The floor plan image 138 may be used to identify areas of navigable and non-navigable space in an interior environment. For instance, the floor plan image 138 may depict areas within the building such as rooms, corridors, stairwells, and other metes and bounds of navigable and non-navigable space. The floor plan generator 136 may analyze the floor plan image 138 to detect these areas of navigable and non-navigable space, and create a data structure that identifies these areas. The server 104 may also provide an interface by which a user may assign a particular floor plan image 138 to a building, and rotate and stretch the floor plan image to fit the building. The floor plan 116 generated in this manner may thus be associated with that building when used in navigation and indoor mapping operations.

The client device 102 may be at a first node of a network 142 and the server 104 may be at a second node of the network 142. The client device 102 and the server 104 may be operative to directly and indirectly communicate with other nodes of the network. For example, the client device 102 may comprise a mobile device that is operative to communicate with the server 104 via the network 142 such that the client device 102 uses the network 142 to transmit and display information to a user via the server 104. The client device 102 may also comprise a plurality of computers that exchange information with different nodes of a network for the purpose of receiving, processing and transmitting data to the client devices; in this instance, the server 104 may be at a different node of the network than any of the computers comprising the client device 102.

The network 142, and the intervening nodes between the client device 102 and the server 104, may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, hypertext transfer protocol ("HTTP") and simple mail transfer protocol ("SMTP"), and various combinations of the foregoing. Although only a single client device is depicted in FIG. 1, it should be appreciated that a typical system may include a large number of connected computers.

Although some functions are indicated as taking place on the client device 102 and other functions are indicated as taking place on the server 104, various aspects may be implemented by a single computer having a single processor. In accordance with one aspect of the system and method, operations performed on the client device 102 may be implemented on the server 104, and vice-versa.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

The system and method may process locations expressed in different ways, such as latitude/longitude positions, street addresses, street intersections, an x-y coordinate with respect to the edges of a map (such as a pixel position when a user clicks on a map), names of buildings and landmarks, and other information in other reference systems that is operative to identify a geographic locations (e.g., lot and block numbers on survey maps). Moreover, a location may define a range of the foregoing.

The system and method may further translate locations from one reference system to another. For example, the client device 102 or server 104 may access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, −122.083939)). In that regard, it will be understood that exchanging or processing locations expressed in one reference system, such as street addresses, may also be received or processed in other references systems as well.

Figure 2:
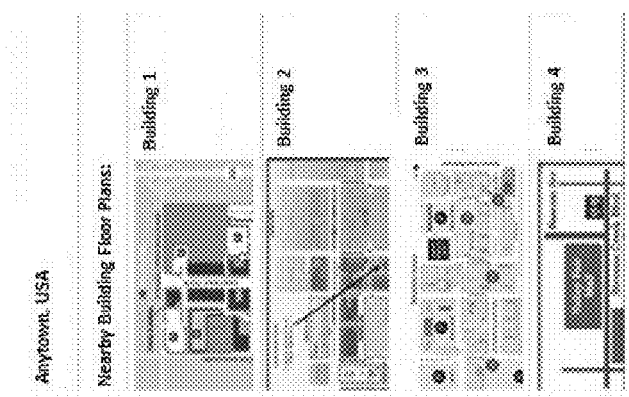
FIG. 2 is an illustration of an example of an interface for selecting a floor plan in accordance with aspects of the disclosure.

FIG. 2 is an illustration of an example of an interface 200 for selecting a floor plan in accordance with aspects of the disclosure. As described above (see FIG. 1), the server 104 may provide the client device 102 with a floor plan 116 for generation of the indoor environment map 117. The mapping application 114 may provide an interface for the user of the client device 102 to select such a floor plan. For example, floor plan images may be uploaded to the server 104 by users of the navigation system. These floor plan images may be associated with particular buildings or locations as described above (see FIG. 1). The server 104 may generate a floor plan using said floor plan images, and provide the floor plans to a user of the client device 102 via the mapping application 114.

The mapping application 114 may identify a user location and display floor plans associated with the user location. For example, the client device 102 may include a location component such as a global positioning system ("GPS") receiver, or the location may be determined using cellular tower information, or any other method of identifying a user location. The server 104 may receive the user location and send a list of floor plans associated with buildings proximate to the user location, such that the user can select a floor plan associated with a nearby building to perform the mapping operation. The user may also be presented with a listing of floor plans that the user has submitted to the server 104.

For example, the user may be prompted to select a floor plan associated with an image that the user uploaded to the server 104, such as the user's office or home. Upon selection of a particular floor plan, the server 104 may provide the selected floor plan to the client device for mapping operations. The client device 102 may thus use the received floor plan for generation of the indoor map environment associated with the floor plan. For example, the floor plan may be used as a base or template and populated with information gathered by the client device 102 as the user walks throughout the space associated with the floor plan.

Figure 3:
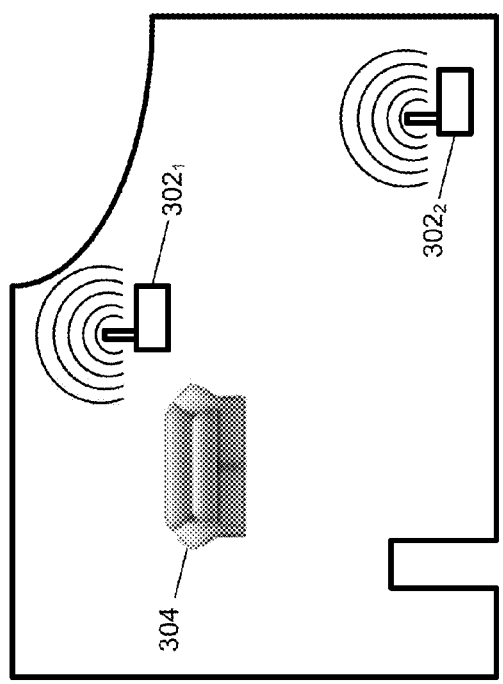
FIG. 3 is an illustration of an example of an indoor environment in accordance with aspects of the disclosure.

FIG. 3 is an illustration of an example of an indoor environment 300 in accordance with aspects of the disclosure. The indoor environment may include an area of open space filled with one or more obstacles (e.g., the couch 304) and one or more wireless access points 302. The indoor environment may be defined by the outer edges of the room, such as would typically be present in a floor plan of the room. As the user walks through the indoor environment during a mapping operation, the wireless signal strength of each of the wireless access points 302 will fluctuate based on a number of factors, such as proximity and whether the signal is obstructed. As the user moves throughout the environment, these signal fluctuations may be captured by the client device and associated with the path the user walks throughout the room. These signal fluctuations may thus be associated with the floor plan of the room such that the location of the user within the room is determined by the signal strength at a given location. Although an example is given using wireless access point signal strength, other location features could also be used, including, but not limited to, cellular tower signal strength, video cues, audio cues, step detection, or barometer readings. Wireless signal strength data gathering operations may also take into account the orientation of the client device, as the strongest variance in signal strength may occur when the user's body is between the client device and the wireless access point, causing the user's body to attenuate the wireless signal. An interface for mapping this exemplary indoor environment 300 is described below (see FIGS. 4-8).

Figure 4:
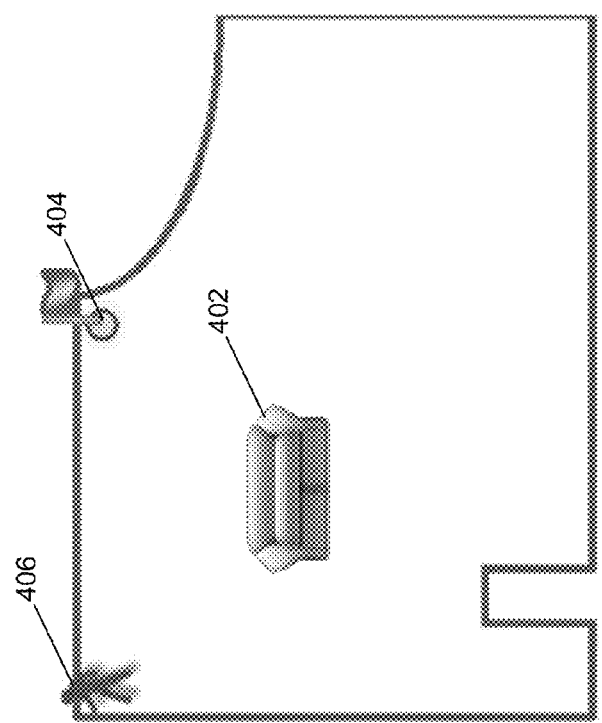
FIG. 4 is an illustration of an example of an interface for mapping an indoor environment in accordance with aspects of the disclosure.

FIG. 4 is an illustration of an example of an interface 400 for mapping an indoor environment in accordance with aspects of the disclosure. For example, the interface 400 may depict a room associated with a floor plan received from the server 104, in which a user wishes to perform a mapping operation. The floor plan may or may not include a representation of obstacles in the room, such as the depiction of the couch 402.

In the displayed interface 400, the user indicates their initial position 404 using the mapping application 114. For example, the user may position an indicator, such as a cross-hair on a floor plan using a mouse, trackball, or touch screen, and perform a selection operation to indicate their starting position. The mapping application 114 may suggest a direction to travel from the starting location, such as by display a representation of the user walking to a particular point, as shown by the stick FIG. 406. As the user travels throughout the room, the client device 102 gathers data about the indoor environment, such as the signal strength of wireless access points as described above (see FIGS. 1 and 3). As the user changes direction, they indicate the places where they stopped on the floor plan using the interface. When starting and ending points for a given path are identified, the information that was gathered as the user walked can be associated with the path between the starting and ending points.

The interface 400 may not depict obstacles, because the obstacles may not be included in the original floor plan. For example, the interface may not depict the couch 402. As such, when data is gathered for the room, the ending points for the user paths may show a clear path around certain parts of the room (e.g., the user cannot walk where the couch is, so no data might be gathered in that area of the floor).

Figure 5:
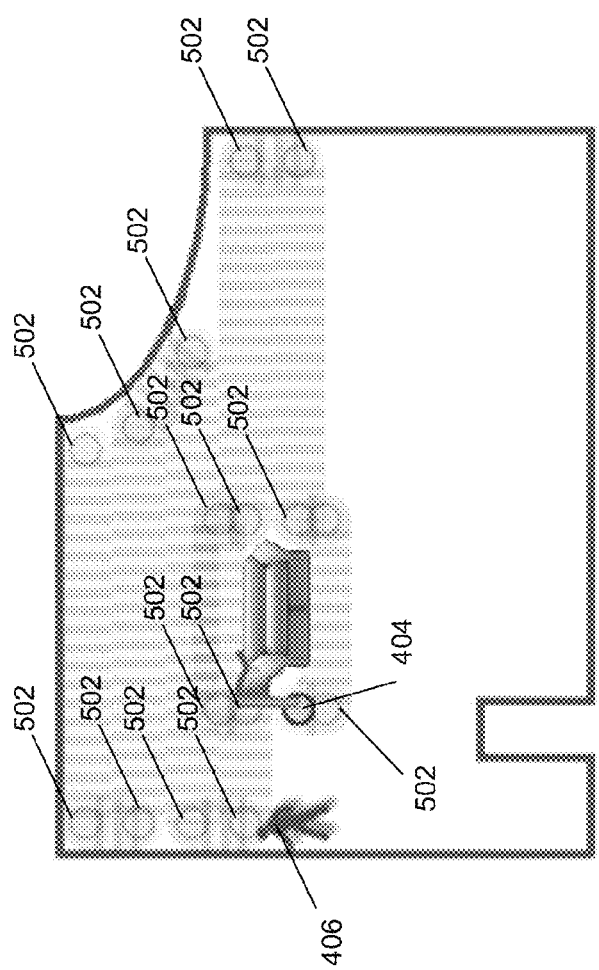
FIG. 5 is another illustration of an example of an indoor mapping operation in accordance with aspects of the disclosure.

FIG. 5 is an illustration of an example of an interface 500 for mapping an indoor environment in accordance with aspects of the disclosure. The interface 500 represents a continuation of the process depicted in FIG. 4. As the user travels throughout the room associated with the floor plan, the user performs selection operations in the interface to indicate when they change directions. Changes in direction may be displayed in the interface 500 as circles 502.

As the user moves throughout the room and indicates their starting and ending points, the gathered information and starting and ending points may be used to determine areas of the room that have been properly mapped. Areas of the room for which data has been gathered and associated (e.g., areas of the room associated with particular wireless signal strengths) may be depicted in the interface 500 as green striped or shaded areas, so the user knows that mapping for those areas is complete. Depending upon the precision of the data gathering operations, the width of the shaded areas may vary. For example, if data is available at a high precision (e.g., a signal may be identified from many wireless access points), then the path may be narrowed to take advantage of a higher location precision. As an example, if two access points are available, the path may have a width (and thus a location resolution) of 3 meters, whereas if four access points are available, the path may have a width of 1.5 meters. The path may be dynamically varied in width if the location precision changes during the mapping operation.

Figure 6:
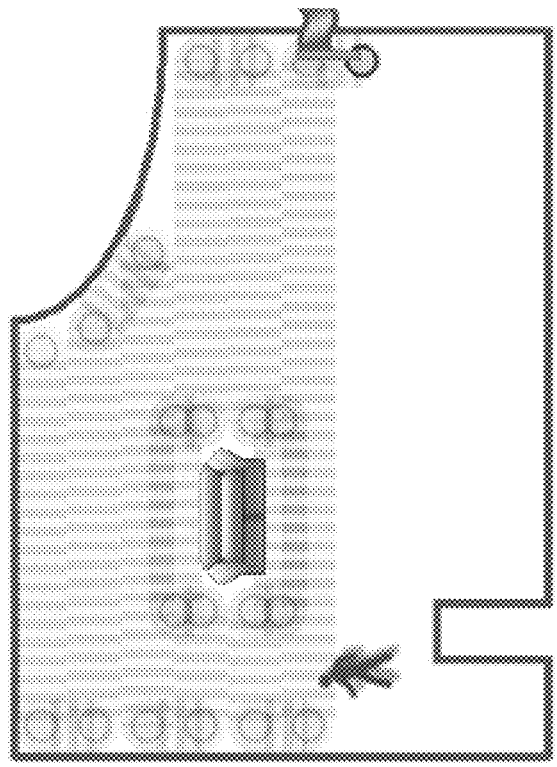
FIG. 6 is a further illustration of an example of an indoor mapping operation in accordance with aspects of the disclosure.

FIG. 6 is an illustration of an example of an interface 600 for mapping an indoor environment in accordance with aspects of the disclosure. As more of the floor plan is associated with gathered information, the interface 600 may continue to prompt the user to walk in a particular direction using a stick figure, or the user may be left to their own devices to choose a direction and to fill up as much of the room as possible with valid data. The interface 600 depicts a path the user may take to continue to gather data for the floor plan.

Figure 7:
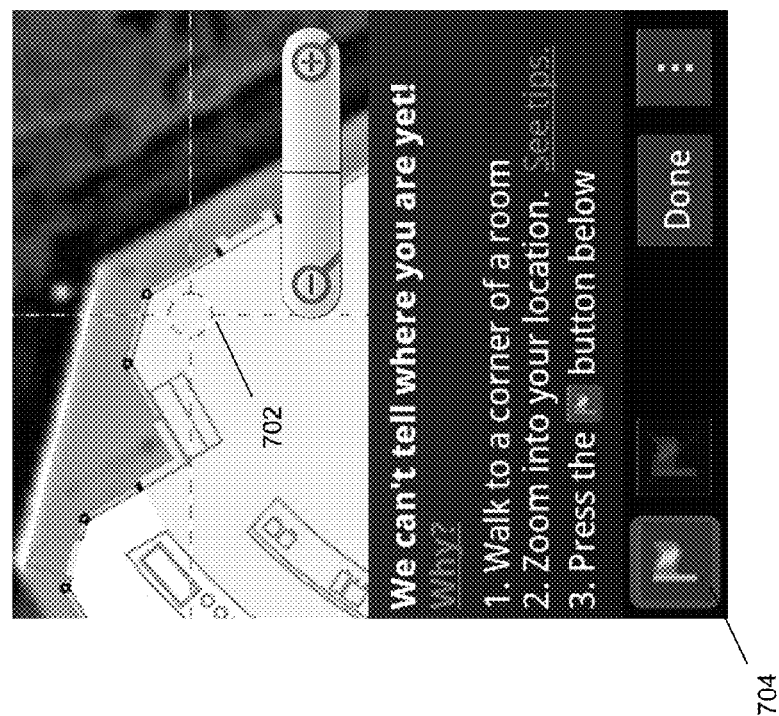
FIG. 7 is another illustration of an example of an interface for selecting a user location in accordance with aspects of the disclosure.

FIG. 7 is an illustration of an example of an interface 700 for selecting a user location in accordance with aspects of the disclosure. In order to associate gathered data with particular locations within the floor plan, the mapping application 114 may provide a user with an interface for identifying their location at the start and/or finish of their pathing throughout the room. One such interface may be a cross-hair as depicted in FIG. 7. The mapping application 114 may display the floor plan image associated with the floor plan provided by the server 104, and allow the user to scroll and zoom through the image to indicate their location using an indicator, such as the cross-hair 702. When the cross-hair 702 is aligned with the user's current location, the user may select a confirmation button 704 to indicate the location.

The indicator may be provided as an open circle to indicate that an exact location is not required, or the size or shape of the indicator may be dynamically determined based on the availability of location information. For example, if multiple wireless access points are available to provide signal strength readings, it may be possible to identify a more precise location of the user than if fewer access points are available. As such, it may be appropriate to increase the precision of the cross-hair 702 (e.g., by decreasing the radius of the circle at the convergence of the two straight lines) because a greater location precision can be determined. Conversely, if fewer access points are available, the mapping application 114 may decrease the precision of the cross-hair 702 by increasing the radius of the circle at the convergence of the lines. Various other methods may be employed for determining a location precision and a cross-hair size other than the number of wireless access points. For example, the size of the cross-hair may be determined based on a signal strength variance of access points, whether data is available from one or more GPS satellites, whether data is available from one or more cellular towers, or any other method of identifying a location precision.

Figure 8:
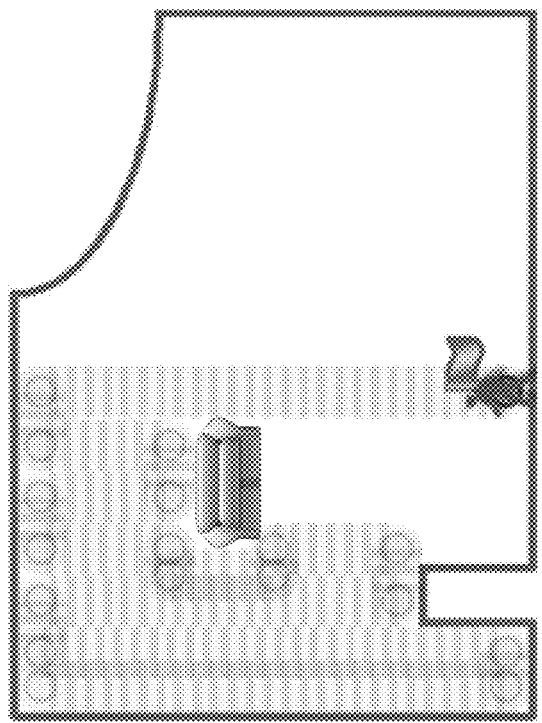
FIG. 8 is another illustration of an example of an alternative indoor mapping operation in accordance with aspects of the disclosure.

FIG. 8 is an illustration of an example of an interface 800 for performing an alternative indoor mapping operation in accordance with aspects of the disclosure. After walking through the floor plan an initial time, the user may indicate that they have covered all navigable area (e.g., area that is not obstructed or otherwise unreachable). The mapping application 114 may then perform verification of the recorded data, such as by prompting the user to walk the floor plan a second time, but via a different set of paths. For example, the mapping application 114 may prompt the user to travel the floor plan via paths perpendicular to the original set of paths, such as depicted in the interface 800. If data is gathered by traveling in a primarily east/west direction during the initial capturing operation, the mapping application 114 may prompt the user to travel along primarily north/south paths, and vice-versa. Data gathered during this second pathing operation may be compared to the data gathered during the initial mapping process to verify and refine the original data.

Figure 9:
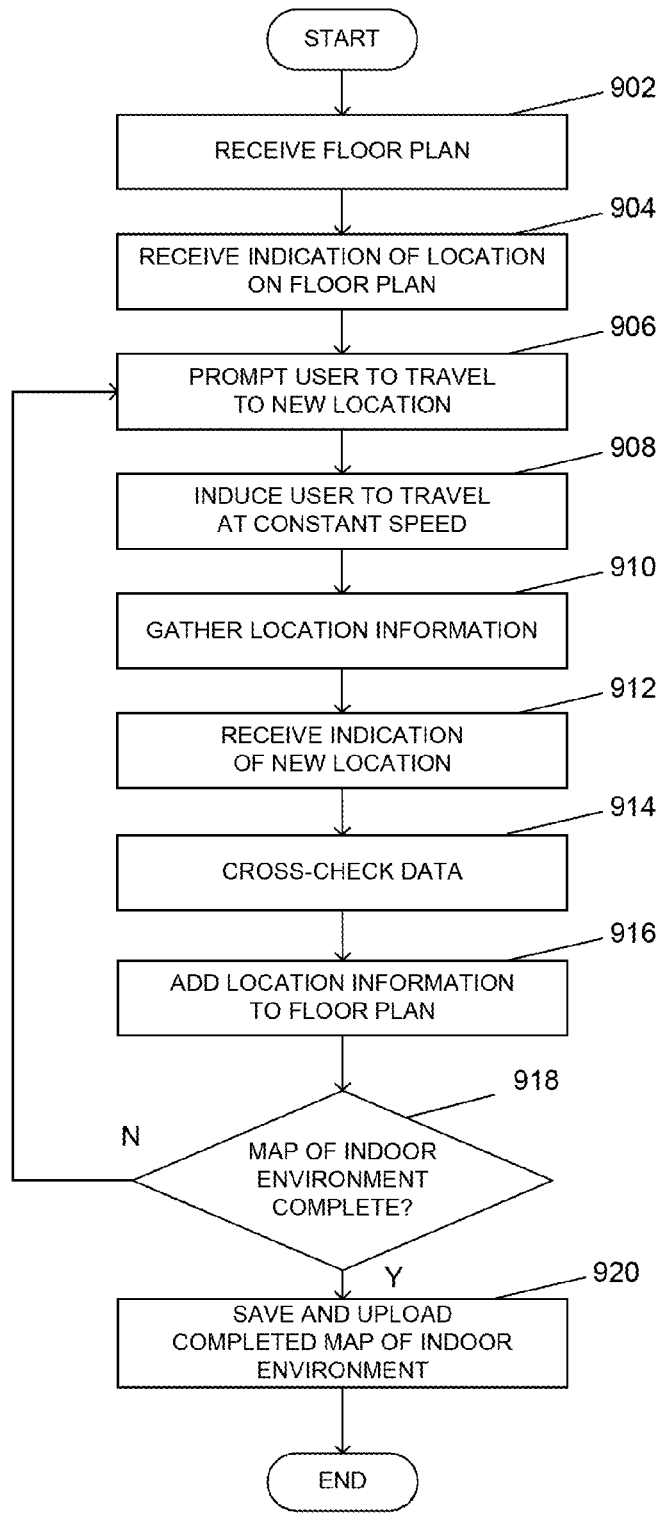
FIG. 9 is a flow diagram depicting a method for mapping an indoor environment in accordance with aspects of the disclosure.

FIG. 9 is a flow diagram depicting a method 900 for mapping an indoor environment in accordance with aspects of the disclosure. The method is operable to map an indoor environment as a user travels through the environment gathering location data. As the user travels through the room and indicates their location, the method gathers the location information and associates the information with particular paths defined by the indicated locations. The method may serve to perform verification of the gathered data along with data cross-checking, along with dynamic configuration of the mapping operation based on factors such as an available location precision. Although aspects of the method may be described as being performed by a client device, the method may also be performed by a remote server, or by a remote server operating in conjunction with a client device. For example, a client device may receive location inputs from a user and gather location information, and transmit the location inputs and location information to the remote server for processing into an indoor environment map.

At action 902, a floor plan is received. For example, a client device 102 may request a floor plan associated with a particular indoor environment from a server 104. The floor plan may provide a template to which navigation information is associated for generating the map of the indoor environment. The user may select a floor plan from a list associated with nearby buildings, a list associated with a user account, or the user may access a floor plan in another manner as described above (see FIG. 2).

At action 904, an indication of an initial location is received. This initial location may function as the first point from which path information is generated to populate the floor plan. For example, the user may indicate their location on the floor plan using a touch screen or via another interface, as described above (see FIGS. 3 and 7).

At action 906, the user may be prompted to travel from the initial location to a second location. For example, the mapping application 114 may receive the first location from the user and indicate a direction of travel to establish a path, or the user may select a direction of travel and indicate as such by selection of a second location (see action 912). The user may be prompted to travel as far in the particular location as possible, and then indicate their new location when they cannot travel any further in the indicated direction. In some aspects, the location may not be specifically indicated by the mapping application 114, and the user may be allowed to select their own direction of travel. In some aspects, elements of the client device 102 such as an accelerometer, a gyroscope, or a compass may be utilized to identify a direction of travel.

At action 908, the user may be induced to travel at a constant speed. For example, the mapping application 114 may cause the client device 102 to vibrate at a particular interval to establish a walking tempo, or the client device 102 may play a music tune or other tone with a particular beat. Steps taken by the user may also be tracked by alternate methods. For example, an accelerometer may measure user footfalls as the user travels along a path from the initial location, and estimate the number of steps taken. When the user specifies an end for the path, the number of steps taken may be used to estimate where the user was along the path as location information is gathered.

The average speed at which the user is walking may be determined by various methods, such as by detecting the user's footfalls or the time taken to reach the destination location. The average speed may be compared to a desired walking speed or an average speed of previous paths. The client device may prompt the user to travel at an average speed in response to detection of a deviation from the average speed or a desired speed. For example, the client device may notify the user with the prompt, "Looks like you walked this last path slower/faster than usual. Maybe you stopped/sped up along the way? Remember to leave a mark whenever you stop or change directions."

At action 910, location information is gathered. The location information is associated with the path along which the user traveled to populate the floor plan with information that may later be retrieved to identify a particular location on the floor plan. For example, the client device 102 may monitor wireless access point signal strength as the user travels along a particular path. The wireless access point signal strength may be associated with the path such that a location along the path may later be identified by reading the wireless signal strength and comparing it to the stored information. Data may be gathered at a particular time interval, such as every 100 milliseconds, every second, or every 5 seconds, or it may be gathered along other quanta. For example, data may be gathered every time a user footfall is registered with an accelerometer.

At action 912, an indication of a new location is received. The new location may be an end of the path along which the user was walking during actions 906-910. Upon receiving the new location (e.g., the "end" of the current path), the method may interpolate the user's location along the path, such as by identifying the number of steps the user took or the time it took the user to travel the path. Individual locations along the path may thus be associated with particular signal readings obtained during the data gathering actions described with respect to action 910.

At action 914, the data gathered when walking along the path may be cross-checked. Cross-checking of the data may include certain tests to eliminate erroneous data. For example, if the user took too long to reach the new location indicated at action 912, then the user may be prompted to walk the path again to gather the data again. The data may also be verified against previously gathered data either by the user or by other users. Although cross-checking of the data is described as being performed at the end of each individual path, the data could also be cross-checked after mapping an entire floor plan, when uploading the floor plan, or at other times.

At action 916, the gathered data is added to the floor plan. As described above, the location information gathered when walking the path may be applied to the template floor plan for later use in navigation operations. Areas of the floor plan that have been associated with the gathered data may be indicated by an interface, such as by the green striped lines described above (see FIGS. 5-6, and FIG. 8). The areas covered by the gathered data may vary in width and size depending upon the precision of the location readings available. If greater location precision is available, the data may be applied to a narrower stripe of the floor plan, thus increasing the precision of the later navigation operations but also potentially requiring additional data gathering operations (e.g., more paths across the room). The location precision may be dynamically defined based on environmental conditions (e.g., the number of wireless access points), or it may be specified in a configuration setting of the mapping application 114.

At action 918, if the map of the indoor environment is not complete, then the method returns to action 906, where the user is prompted to continue data gathering operations. The determination of whether the navigation operation is complete may be performed by the user (e.g., the user decides the floor plan is as complete as possible, or they do not have time to gather additional data), or the mapping application 114 may compare the navigable area of the floor plan with the coverage completed during the mapping operation. If the coverage is greater than a threshold value, then the mapping operation may be judged to be complete. In some aspects, the user may be prompted to determine whether the navigation operation should be completed after a certain threshold is complete, allowing the user to continue gathering data if they wish for greater precision or believe the floor plan has not been completely mapped. The user may also be prompted to map the floor plan in an alternate direction to gather additional data and verify the previously gathered information, as described above (see FIG. 8). If the floor plan is judged to have been completed, the method proceeds to action 920.

At action 920, the completed indoor environment map may be uploaded to a server 104 for hosting and use in navigation operations. The indoor environment map may also be stored locally on the client device 102, and used by the client device 102 to perform navigation operations. The server 104 may analyze the data and convert the data into a format suitable for use in navigation information, as the client device 102 may lack the capacity to generate the indoor environment map using the raw signal strength and location data. The server 104 may perform verification testing on the indoor environmental map, and it may be stored for use by other users. The server 104 may also aggregate navigation data provided by users of the mapping application to create indoor environmental maps from a superset of data provided by more than one user. This superset of data may be used for additional verification and to provide more accurate location readings in navigation operations.

The stages of the illustrated methods described above are not intended to be limiting. The functionality of the methods may exist in a fewer or greater number of stages than what is shown and, even with the depicted methods, the particular order of events may be different from what is shown in the figures and include additional stages or omit stages as shown.

The systems and methods described above advantageously provide a flexible, user-friendly method and system for mapping an indoor environment. Such a system is capable of being utilized by users with a variety of consumer electronics, such as smartphones and PDAs, to map their indoor environments for use in navigation operations. As such, users may take advantage of indoor navigation services that may have previously required complex, cumbersome equipment. A straight-forward user interface provides an accurate indication of areas of the floor plan that have or have not been mapped, ensuring minimum redundancy during the data gathering process. The system also provides safeguards and error checking to ensure that the indoor environmental maps created are accurate and useful. Dynamic reconfiguration of the data gathering operation ensures that location data is collected at a maximum resolution, while also saving time and effort in circumstances where a high location resolution is unavailable. The ability to use standard interfaces and devices provides users the ability to crowd-source the creation of indoor navigation maps, eliminating the need for specially training and equipment to associate a given location with indoor navigation data.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A computer-implemented method for mapping an indoor location, the method comprising:
   providing, by one or more processors, a floor plan image corresponding to the indoor location;
   receiving, by the one or more processors, a first input to indicate a first location on the floor plan image;
   vibrating, by the one or more processors, a mobile device at a particular interval in order to establish a walking tempo for a user walking between the first location and a second location;
   gathering, by the one or more processors, location information as the user walks from the first location to the second location;
   receiving, by the one or more processors, a second input to indicate the second location on the floor plan image;
   determining, by the one or more processors, a path from the first location to the second location; and
   generating, by the one or more processors, an indoor map using the gathered location information, the indoor map identifying the first location, the second location, and the path.

2. The method of claim 1, further comprising associating the location information with at least one location within the indoor map corresponding to the path.

3. The method of claim 1, further comprising, prior to gathering the location information, providing a notification for the user to walk in a straight line when traveling from the first location to the second location.

4. The method of claim 3, further comprising playing an audio tone in order to induce the user to move at a constant speed from the first location to the second location.

5. The method of claim 1, further comprising, prior to gathering the location information, providing a notification for the user to travel in a particular direction in order to reach the second location.

6. The method of claim 1, further comprising:
   determining a location precision for a data gathering operation; and
   using the location precision to determine a location resolution for the indoor map.

7. The method of claim 6, wherein the location precision is determined using a number of available wireless access points for which signal strength data is available.

8. The method of claim 7, wherein the location precision includes a size of an indicator for indicating a current location.

9. The method of claim 7, wherein the location precision includes a width of a stripe for indicating an area of the indoor map for which the location information has been gathered.

10. The method of claim 1, further comprising:
    determining a coverage level of the indoor map compared to the floor plan image; and
    identifying the indoor map as complete when the coverage level is greater than a predetermined threshold.

11. A system for mapping an indoor location, the system comprising:
    memory configured to store location information and an indoor map; and
    one or more processors configured to:
       provide a floor plan image corresponding to the indoor location,
       receive a first input to indicate a first location on the floor plan image, vibrate a mobile device at a particular interval in order to establish a walking tempo for a user walking between the first location and a second location, gather the location information as the user walks from the first location to the second location, receive a second input to indicate the second location on the floor plan image, determine a path from the first location to the second location, and generate the indoor map using the gathered location information, the indoor map identifying the first location, the second location, and the path.

12. The system of claim 11, wherein the one or more processors are further configured to associate the location information with at least one location within the indoor map corresponding to the path.

13. The system of claim 11, wherein the one or more processors are further configured to, prior to gathering the location information, provide a notification for the user to walk in a straight line when traveling from the first location to the second location.

14. The system of claim 11, wherein the one or more processors are further configured to, prior to gathering the location information, provide a notification for the user to travel in a particular direction in order to reach the second location.

15. The system of claim 11, wherein the one or more processors are further configured to play an audio tone in order to induce the user to move at a constant speed from the first location to the second location.

16. The system of claim 11, wherein the one or more processors are further configured to:
   determine a location precision for a data gathering operation, and
   use the location precision to determine a location resolution for the indoor map.

17. The system of claim 16, wherein the location precision is determined using a number of available wireless access points for which signal strength data is available.

18. The system of claim 17, wherein the location precision includes a size of an indicator for indicating a current location.

19. The system of claim 17, wherein the location precision includes a width of a stripe for indicating an area of the indoor map for which the location information has been gathered.

20. A non-transitory computer readable storage medium containing instructions, that when executed by one or more processors, cause the one or more processors to perform a method for mapping an indoor location, the method comprising:
   providing a floor plan image corresponding to the indoor location;
   receiving a first input to indicate a first location on the floor plan image;
   vibrating a mobile device at a particular interval in order to establish a walking tempo for a user walking between the first location and a second location;
   gathering location information as the user walks from the first location to the second location;
   receiving a second input to indicate the second location on the floor plan image;
   determining a path from the first location to the second location; and
   generating an indoor map using the gathered location information, the indoor map identifying the first location, the second location, and the path.

* * * * *